US009357090B2

(12) United States Patent
Hozono

(10) Patent No.: US 9,357,090 B2

(45) Date of Patent: May 31, 2016

(54) IMAGE PROCESSING DEVICE

(71) Applicant: KYOCERA Document Solutions Inc., Osaka-shi, Osaka (JP)

(72) Inventor: Tomohide Hozono, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/664,708

(22) Filed: Mar. 20, 2015

(65) Prior Publication Data

US 2015/0281484 A1 Oct. 1, 2015

(30) Foreign Application Priority Data

Mar. 31, 2014 (JP) ................................ 2014-073781

(51) Int. Cl.
*H04N 1/04* (2006.01)
*H04N 1/00* (2006.01)

(52) U.S. Cl.
CPC ....... *H04N 1/00549* (2013.01); *H04N 1/00557* (2013.01); *H04N 1/00559* (2013.01); *H04N 2201/0081* (2013.01); *H04N 2201/0094* (2013.01)

(58) Field of Classification Search
CPC .......... H04N 1/00549; H04N 1/00559; H04N 1/00557
USPC ................................. 358/471, 474, 498, 497
See application file for complete search history.

(56) References Cited

U.S. PATENT DOCUMENTS 5,592,308 A * 1/1997 Fujiwara .............. H04N 1/1013 250/234
7,072,082 B2 * 7/2006 Yokota ................ H04N 1/0464 250/208.1
7,804,625 B2 * 9/2010 Osakabe ............. H04N 1/1017 358/474

FOREIGN PATENT DOCUMENTS

JP 2013111842 A 6/2013

* cited by examiner

*Primary Examiner* — Houshang Safaipour

(74) *Attorney, Agent, or Firm* — Alleman Hall McCoy Russell & Tuttle LLP

(57) ABSTRACT

An image processing device according to one aspect of the present disclosure includes a moving body, a housing, a support portion, and a first contact portion. The moving body is composed of a resin member and has a surface on which a holding plate which holds an electric component used for image processing is mounted. The housing includes a pair of side walls between which the moving body is housed therein. The support portion is provided to the housing and configured to support the moving body such that the moving body is movable in a predetermined moving direction. The first contact portion is provided to the moving body, and is configured to be contactable with a contacted portion within the housing prior to the holding plate when the moving body reaches a contact position where it is possible to contact with the contacted portion.

3 Claims, 11 Drawing Sheets

UP
LEFT
REAR
FRONT
RIGHT
DOWN
11
13
13A
29
21
16
18
15
17
10

IMAGE PROCESSING DEVICE

INCORPORATION BY REFERENCE

This application is based upon and claims the benefit of priority from the corresponding Japanese Patent Application No. 2014-073781 filed on Mar. 31, 2014, the entire contents of which are incorporated herein by reference.

BACKGROUND

The present disclosure relates to an image processing device such as an image reading device which includes a moving body having a surface on which a holding plate which holds an electric component used for image processing is mounted.

A conventional image reading device includes a reading unit which includes: a reading sensor in which a plurality of image sensors are arranged in a main-scanning direction; a light emitting element such as an LED which applies light to an imaging target; optical components such as a lens and a mirror; and the like. The reading unit includes a carriage (moving body) composed of a resin member. The reading sensor, the light emitting element, the optical components, and the like are mounted in the carriage, and a drive substrate (holding plate) for driving the reading sensor and the light emitting element is also mounted in the carriage. The carriage is housed within a housing of the image reading device and supported so as to be movable in a sub-scanning direction (a direction perpendicular to the main-scanning direction) along a guide shaft provided within the housing. In the image reading device, an image on a document sheet placed on a document table is read by causing the reading sensor to perform a reading operation while moving the carriage in the sub-scanning direction.

Meanwhile, when the image reading device is transported, if the carriage freely moves, the carriage may collide against an internal frame of the housing and be damaged. Thus, hitherto, for example, a configuration in which the carriage is fixed at a non-contact position by means of a fixing member, and a configuration in which a shock absorbing member is provided between the carriage and the internal frame for alleviating a shock, are known.

SUMMARY

An image processing device according to one aspect of the present disclosure includes a moving body, a housing, a support portion, and a first contact portion. The moving body is composed of a resin member and has a surface on which a holding plate which holds an electric component used for image processing is mounted. The housing includes a pair of side walls between which the moving body is housed therein. The support portion is provided to the housing and configured to support the moving body such that the moving body is movable in a predetermined moving direction. The first contact portion is provided to the moving body, and is configured to be contactable with a contacted portion within the housing prior to the holding plate when the moving body reaches a contact position where it is possible to contact with the contacted portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. It should be noted that the embodiment described below is merely an example embodying the present disclosure, and does not limit the technical scope of the present disclosure.

Figure 1:
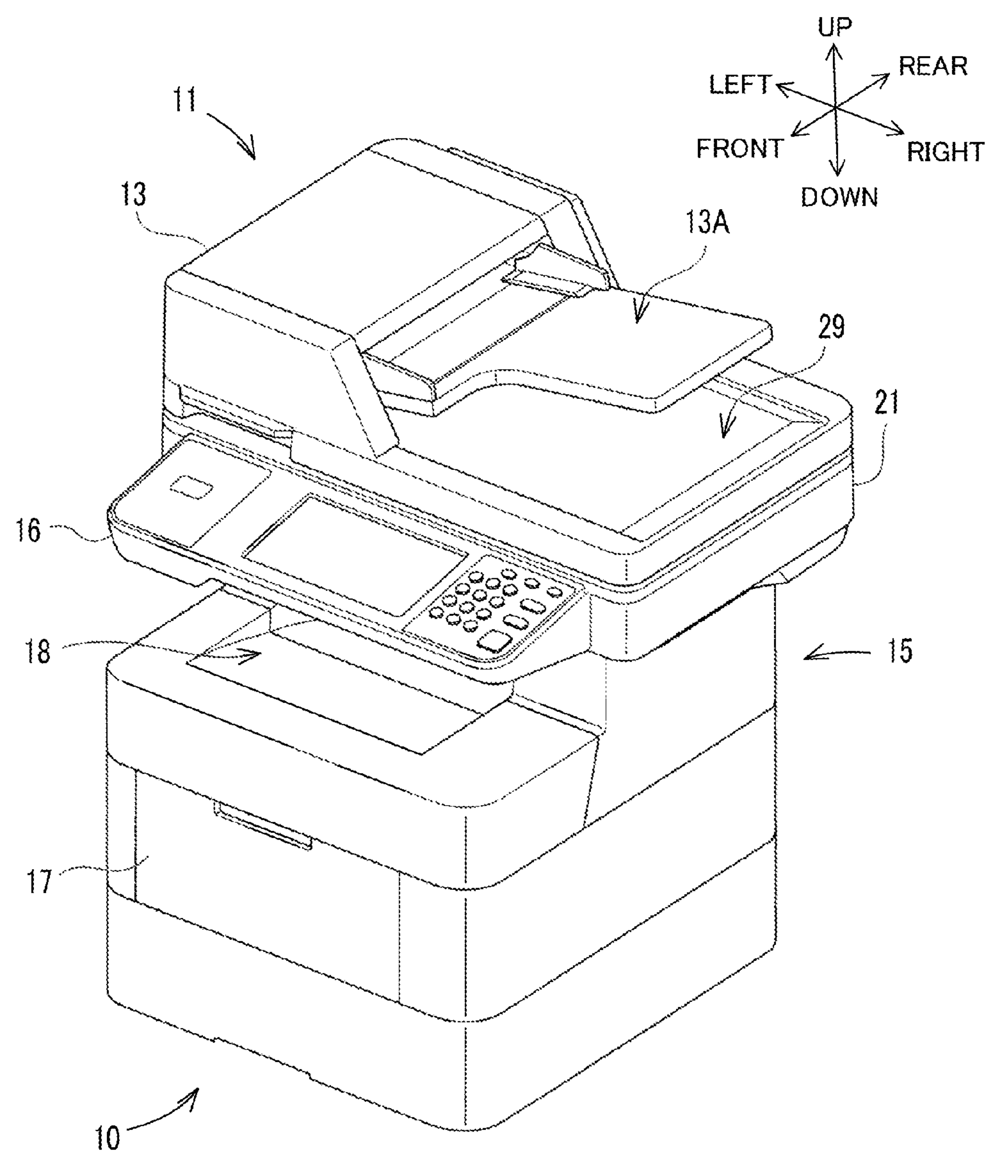
FIG. 1 is a perspective view showing an image forming apparatus including an image reading device according to an embodiment of the present disclosure.
Figure 2A:
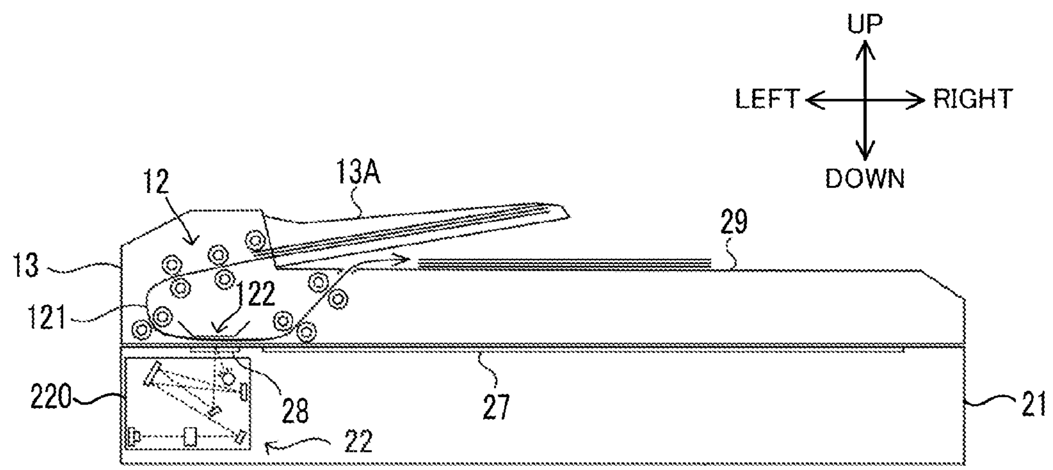
FIGS. 2A and 2B are diagrams showing the internal configuration of the image reading device.

First, an image reading device 11 which is an example of an image processing device according to the embodiment of the present disclosure, and the configuration of an image forming apparatus 10 which includes the image reading device 11 will be described with reference to FIGS. 1, 2A, and 2B. The image forming apparatus 10 is a multifunction peripheral having an image reading function, a facsimile function, an image forming function, and the like. As shown in FIG. 1, the image forming apparatus 10 includes the image reading device 11, an ADF (Auto Document Feeder) 13, an image forming portion 15, an operation display portion 16, a sheet feed cassette 17, and a sheet discharge portion 18. It should be noted that in the present embodiment, the image forming apparatus 10 including the image reading device 11 which is an example of the image processing device according to the present disclosure is described as an example, but the present disclosure is not limited thereto. For example, in the present disclosure, the image reading device 11 may be independent as an image processing device from the image forming apparatus 10, or a facsimile apparatus or a copying machine may include the image reading device 11.

The image forming portion 15 executes a color or monochrome image forming process (printing process) in accordance with an electrophotographic method. The image forming portion 15 executes the image forming process on the basis of image data read by the image reading device 11 or image data inputted thereto from an information processing apparatus such as an external personal computer or the like. The image forming portion 15 includes an image forming unit, an exposure device, an intermediate transfer belt, a secondary transfer roller, a fixing device, and the like.

The ADF 13 is provided to the image reading device 11. The ADF 13 takes out, one by one, document sheets placed on a document set portion 13A, and sequentially conveys the document sheets along a conveyance path 12 to an image reading position 122 of the image reading device 11. Thus, the image reading device 11 is allowed to read image data from each document sheet being conveyed by the ADF 13. Here, the conveyance path 12 is a path extending sequentially through: a turn-around portion 121 at which a document conveyance direction is reversed; and the predetermined image reading position 122. The image reading position 122 is a position at which an image on a document sheet can be read by the image reading device 11, and is a position irradiated with light by a later-described reading unit 22.

The image reading device 11 is mounted on an upper portion of the image forming apparatus 10. The image reading device 11 reads image data from a document sheet. As shown in FIG. 2A, the image reading device 11 includes the reading unit 22, a contact glass 27 (an example of a sheet placement plate of the present disclosure), a contact glass 28, a document holder 29, a housing 21, and the like. These components are housed within the housing 21 which forms a housing of the image reading device 11. The housing 21 will be described in detail later.

Both the contact glass 27 and the contact glass 28 are mounted on an upper portion of the housing 21. The contact glass 27 is a region in which a document sheet (sheet member) which is an image reading target is placed. The contact glass 28 is a region which allows light emitted from the reading unit 22 to a document sheet being conveyed by the ADF 13 to be transmitted therethrough.

Figure 2B:
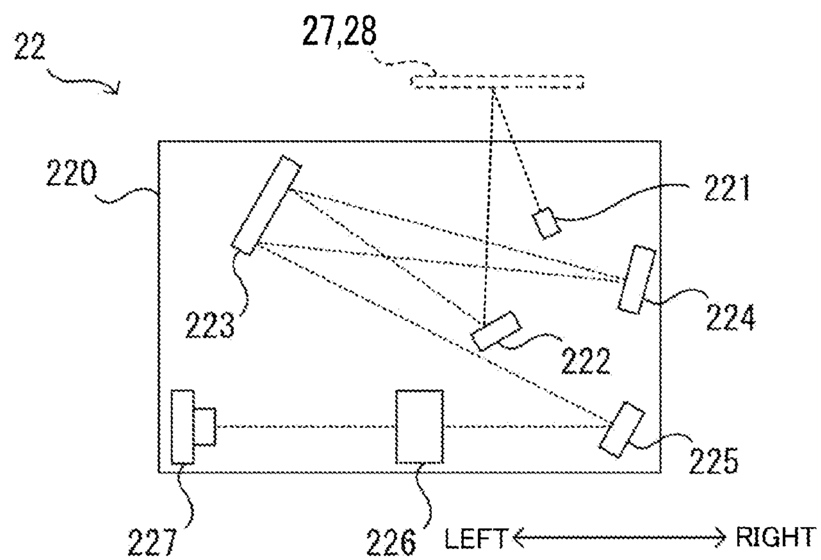

As shown in FIG. 2B, the reading unit 22 includes a light source 221, mirrors 222 to 225, an optical lens 226, an image sensor 227, and the like. These optical components are housed within a carriage 220 (an example of a moving body of the present disclosure) which forms a housing of the reading unit 22. The carriage 220 will be described in detail later.

The light source 221 includes a large number of white LEDs arranged along a main-scanning direction (a front-rear direction in FIG. 1). The carriage 220 of the reading unit 22 is configured to be movable in a sub-scanning direction (a right-left direction in FIG. 2A) by a conventionally-known moving mechanism using a drive device (electric motor) such as a stepping motor or the like. The moving mechanism is, for example, a belt transmission mechanism or a gear transmission mechanism which transmits a driving force from the motor to the carriage 220. In the image reading device 11, when a document sheet is placed on the contact glass 27 and the document holder 29 is closed, the reading unit 22 is moved within the housing 21 relative to the document sheet in the sub-scanning direction by the drive device. During the movement of the reading unit 22, scanning is performed in the sub-scanning direction with the light applied from the light source 221 to the contact glass 27. Thus, an image on the document sheet is read. In addition, in the image reading device 11, in reading an image from a document sheet being conveyed by the ADF 13, the reading unit 22 is moved to a position at which the light of the light source 221 is applied to the contact glass 28, that is, to a position below the contact glass 28. Then, during the conveyance of the document sheet, the light is applied from the light source 221 of the reading unit 22 to the contact glass 28. Thus, an image on the document sheet is read.

Specifically, when the reading unit 22 receives reflected light from the document sheet, the reflected light is reflected toward the mirror 222. The mirrors 222 to 225 are reflection mirrors which guide the reflected light which has been emitted from the light source 221 and reflected on the document sheet, to the optical lens 226. The reflected light is reflected sequentially on the mirror 222, the mirror 223, the mirror 224, the mirror 223, and the mirror 225 and guided to the optical lens 226 as shown by a dotted line in FIG. 2B. The optical lens 226 causes the light entering from the mirror 225 to be converged on and enter the image sensor 227. The image sensor 227 is an image sensor having a photoelectric conversion element. The image sensor 227 inputs an electric signal based on the reflected light, as image data of the document sheet to a control portion which is not shown.

Hereinafter, the housing 21 and the reading unit 22 will be described in detail with reference to FIGS. 3 to 11.

Figure 3:
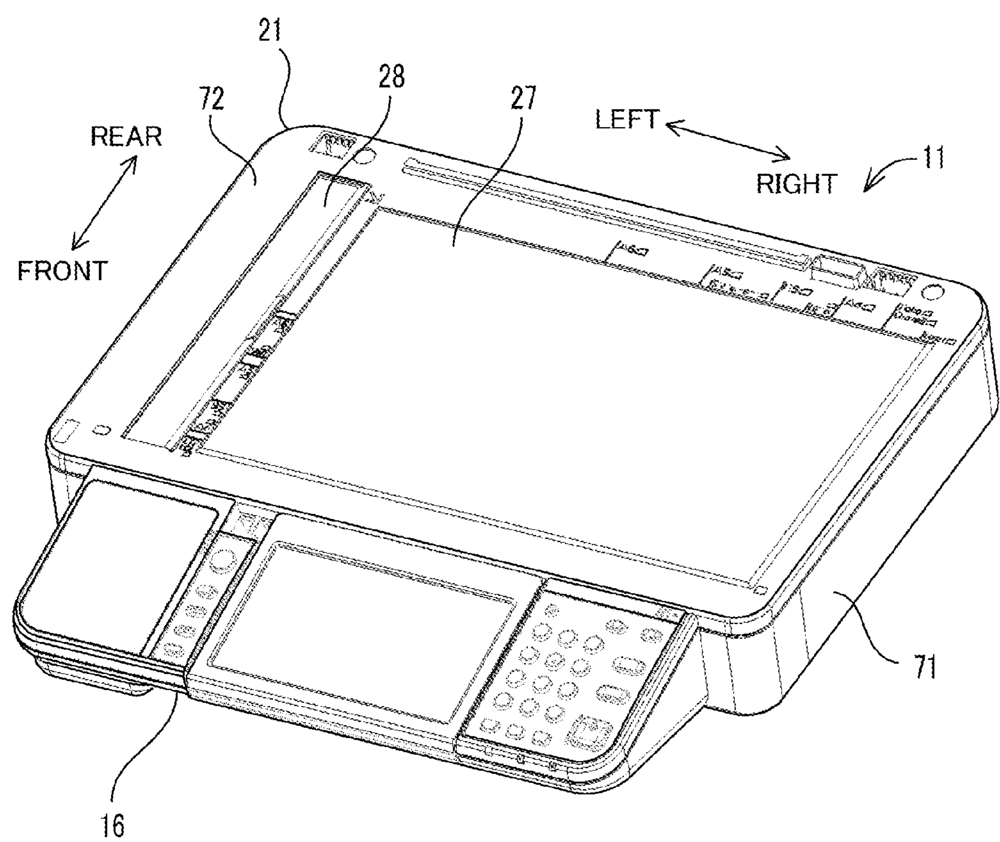
FIG. 3 is a perspective view showing the image reading device.
Figure 4:
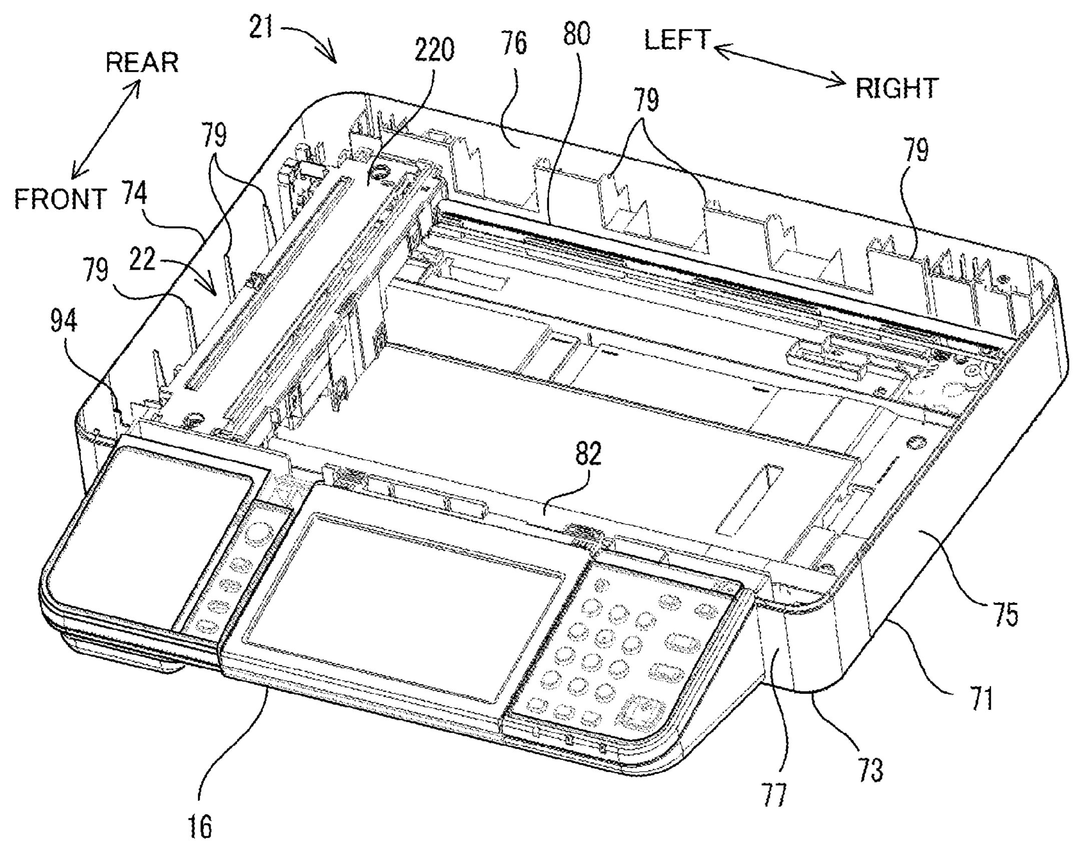
FIG. 4 is a perspective view showing the internal configuration of a housing of the image reading device.

As shown in FIGS. 3 and 4, the housing 21 is the housing of the image reading device 11. The housing 21 is connected to an upper portion of a housing of the image forming portion 15. The housing 21 forms a part of a housing of the image forming apparatus 10 by being mounted on the housing of the image forming portion 15 and the like.

As shown in FIG. 3, the housing 21 includes a lower frame 71 and an upper frame 72. Each of the lower frame 71 and the upper frame 72 is a molded article formed from a synthetic resin. As shown in FIG. 4, the lower frame 71 is a member which forms a bottom surface and side surfaces of the housing 21. Specifically, the lower frame 71 includes: a flat bottom plate 73 having a rectangular shape which is long in the right-left direction; and four side plates 74 to 77 erected from four edge sides of the bottom plate 73. In other words, the housing 21 includes a pair of the side plates 74 and 75 (an example of side walls of the present disclosure) which are spaced apart from each other in a longitudinal direction and opposed to each other; and a pair of the side plates 76 and 77 which are spaced apart from each other in a lateral direction and opposed to each other. The reading unit 22 is housed within the internal space of the lower frame 71, that is, within a space surrounded by the bottom plate 73 and the four side plates 74 to 77.

As shown in FIG. 3, the upper frame 72 is formed in a rectangular shape which is long in the right-left direction so as to correspond to the shape of the lower frame 71. The upper frame 72 is mounted on an upper portion of the lower frame 71, thereby covering an upper opening of the lower frame 71. The upper frame 72 is fitted and mounted, from above, to upper end portions of the side plates 74 to 77 which are an edge portion of the upper opening of the lower frame 71.

The upper frame 72 has two openings formed so as to be spaced apart from each other in the right-left direction. The contact glass 28 is mounted at an outer edge of the left opening, and the contact glass 27 is mounted at an outer edge of the right opening. Specifically, each of the contact glasses 27 and 28 is joined to a lower surface of the outer edge of the corresponding opening by means of an adhesive member such as a double-sided adhesive tape. In addition, when the upper frame 72 is mounted on the lower frame 71, the lower surfaces of the contact glasses 27 and 28 are supported by support ribs 79 formed on the inner surfaces of the side plates 74 to 77, and the like from the lower side. Thus, the contact glasses 27 and 28 are vertically interposed and fixed between the upper frame 72 and the support ribs 79 of the lower frame 71.

As shown in FIG. 4, a support shaft 80 and a support rail 82 are provided to the lower frame 71. The support shaft 80 and the support rail 82 are an example of a support portion of the present disclosure. The support shaft 80 and the support rail 82 support the carriage 220 of the reading unit 22 such that the carriage 220 is movable in the sub-scanning direction. The support shaft 80 is a round-bar-like member provided so as to extend between the pair of the side plates 74 and 75. The support shaft 80 is provided at a position close to the side plate 76, that is, at the rear side of the lower frame 71 in FIG. 4. The support shaft 80 is fixed at one end thereof to the side plate 74 and at the other end thereof to the side plate 75. The support shaft 80 is inserted through a later-described guide hole 92 (see FIG. 6) of the carriage 220. Since the support shaft 80 is inserted through the guide hole 92, the carriage 220 is made movable in the sub-scanning direction along the support shaft 80. The support rail 82 is a member which is long in the sub-scanning direction and erected upward on the bottom plate 73. The support rail 82 is provided so as to connect the pair of the side plates 74 and 75. The support rail 82 is provided at a position close to the side plate 77, that is, at the front side of the lower frame 71 in FIG. 4. The support rail 82 supports a rail guide 93 (see FIG. 7, an example of a supported portion of the present disclosure) provided on a lower surface of one end portion of the carriage 220 in the main-scanning direction, such that the rail guide 93 is slidable in the sub-scanning direction. Since the support shaft 80 and the support rail 82 are provided to the lower frame 71 as described above, the carriage 220 is supported so as to be movable in the sub-scanning direction.

Figure 5:
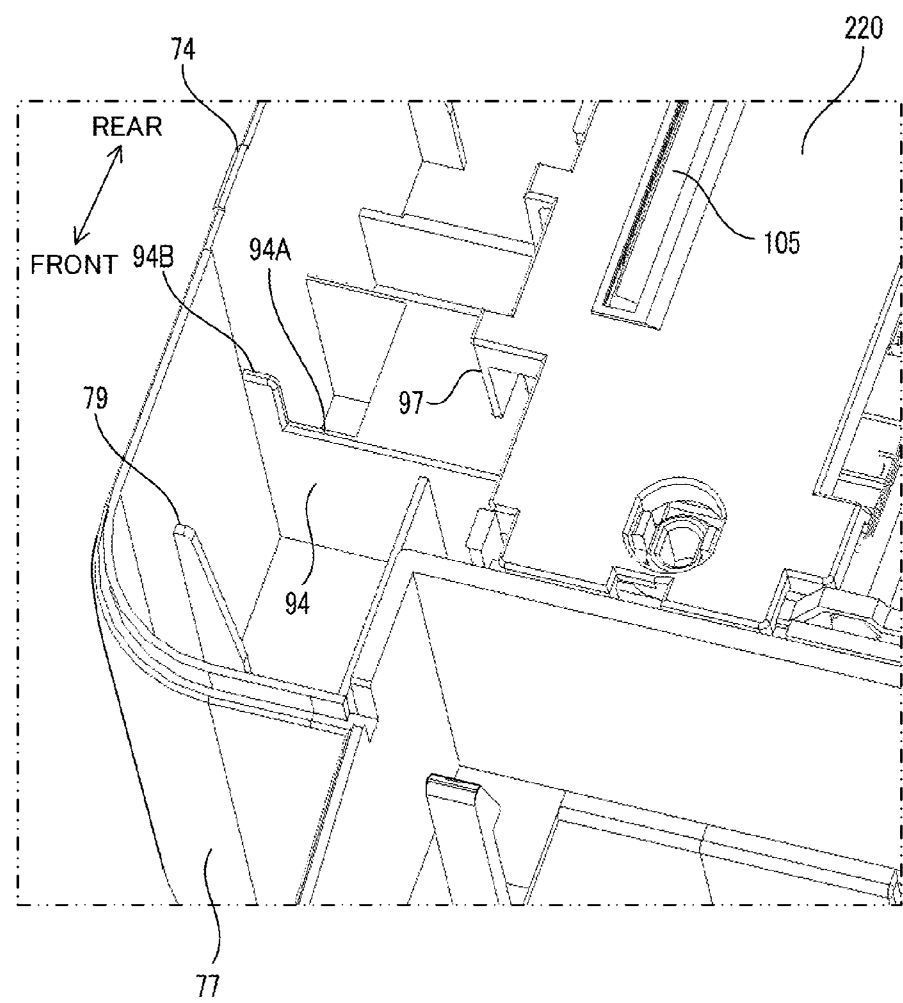
FIG. 5 is a partially enlarged view of the housing.

As shown in FIGS. 4 and 5, a projection rib 94 (an example of a contacted portion of the present disclosure) is provided to the lower frame 71. In the present embodiment, two projection ribs 94 are provided to the lower frame 71. The two projection ribs 94 are provided on the inner surface of the side plate 74. It should be noted that in FIGS. 4 and 5, only one of the projection ribs 94 provided to the side plate 74 is shown, and the other projection rib 94 is not shown. As shown in FIG. 5, the one projection rib 94 is provided at the front side on the side plate 74. In addition, the other projection rib 94 is provided at the rear side on the side plate 74 (see FIG. 8). The projection ribs 94 project from the inner surface of the side plate 74 in a direction perpendicular to the inner surface of the side plate 74. Each projection rib 94 is formed in a plate rib shape extending upward from the bottom plate 73 and is formed so as to be integrated with the lower frame 71. Each projection rib 94 has steps, that is, a lower step 94A at a lower position and an upper step 94B at a position above the lower step 94A. The lower step 94A extends in the sub-scanning direction. The upper step 94B projects in a movement range of the carriage 220. As described later, the upper step 94B is configured to be brought into contact with a part of the carriage 220 when the carriage 220 moves toward the left side of the lower frame 71 to a position at which the carriage 220 comes into contact with the side plate 74.

Figure 8:
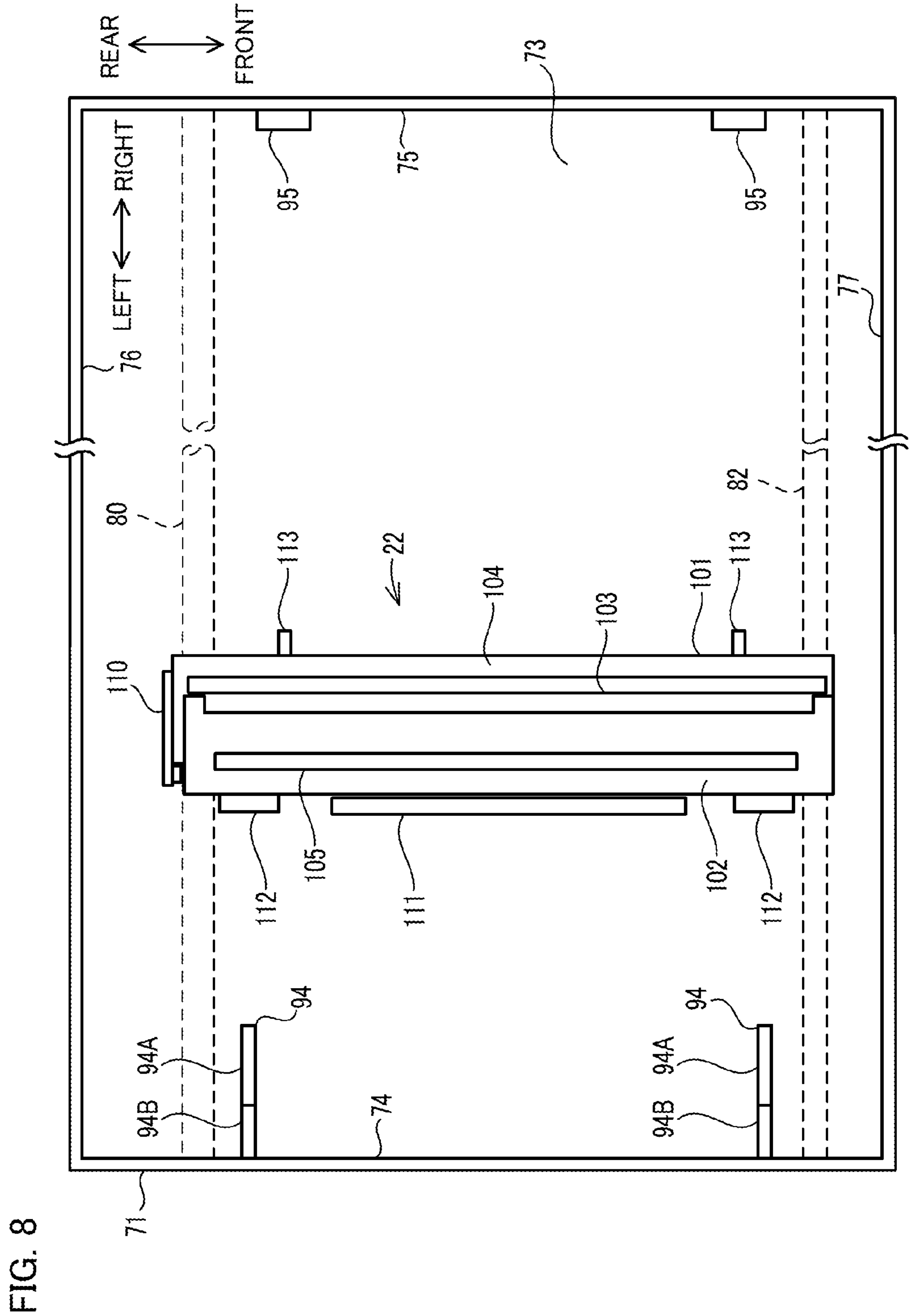
FIG. 8 is a diagram showing the position of the reading unit in the housing.

As shown in FIG. 8, a stopper portion 95 (an example of the contacted portion of the present disclosure) is provided to the lower frame 71. In the present embodiment, two stopper portions 95 are provided to the lower frame 71. The two stopper portions 95 are provided on the inner surface of the side plate 75. Each stopper portion 95 projects from the inner surface of the side plate 75 by an amount equal to the thickness of the side plate 75, and has an inner surface formed in a flat rectangular shape. One of the stopper portions 95 is provided at the front side on the side plate 75. In addition, the other stopper portion 95 is provided at the rear side on the side plate 75. Each stopper portion 95 is formed so as to be integrated with the lower frame 71. Each stopper portion 95 is provided in the movement range of the carriage 220. As described later, each stopper portion 95 is configured to be brought into contact with a part of the carriage 220 when the carriage 220 moves toward the right side of the lower frame 71 to a position at which the carriage 220 comes into contact with the side plate 75. It should be noted that the stopper portions 95 may not be provided and a part of the carriage 220 may be brought into contact with the inner surface of the side plate 75. In this case, the side plate 75 corresponds to the contacted portion of the present disclosure.

Figure 6:
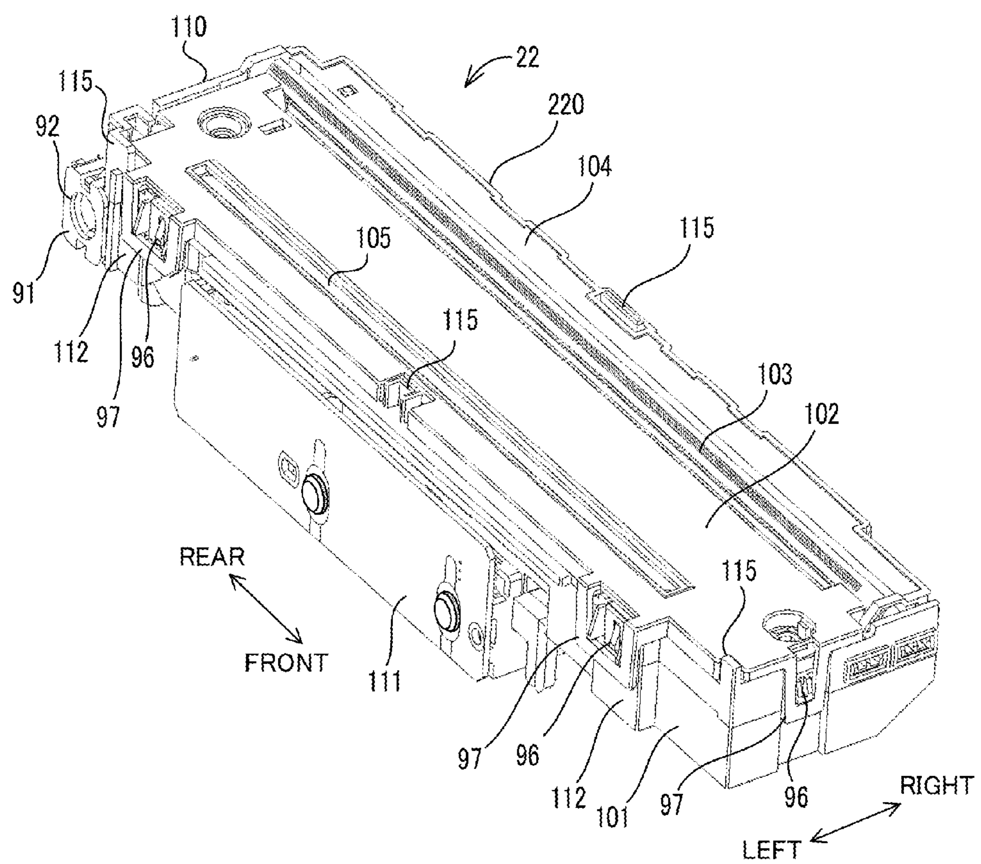
FIG. 6 is a perspective view showing a reading unit of the image reading device.
Figure 7:
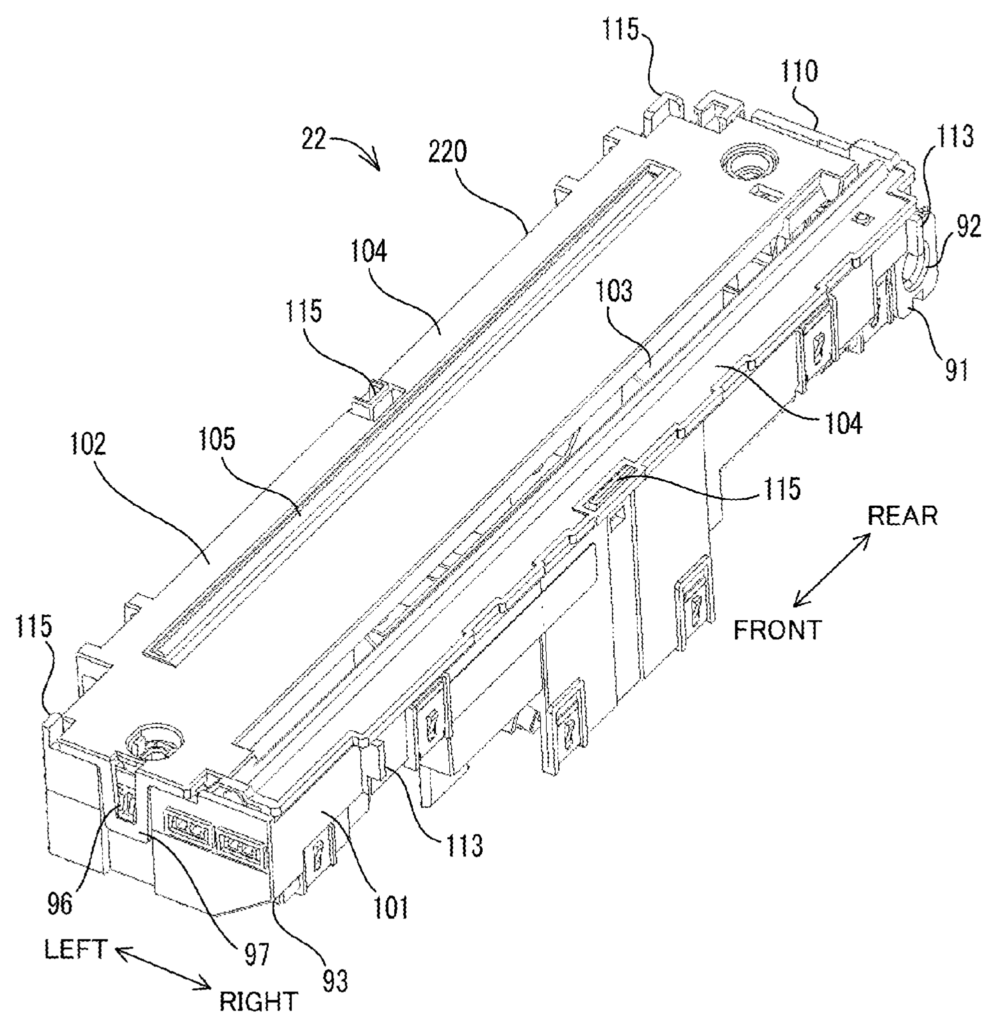
FIG. 7 is a perspective view showing the reading unit of the image reading device.

As shown in FIGS. 6 and 7, the reading unit 22 includes the carriage 220 which forms the housing thereof. The carriage 220 is a molded article formed from a synthetic resin. The carriage 220 includes a main body portion 101 and a cover 102. The main body portion 101 is formed in a rectangular parallelepiped shape which is long in a direction which coincides with the main-scanning direction. In other words, the main body portion 101 is formed in a shape which is long in the main-scanning direction perpendicular to the sub-scanning direction which is the moving direction of the carriage 220. The optical components such as the light source 221, the mirrors 222 to 225, and the like are housed within the main body portion 101.

The cover 102 is mounted on an upper surface of the main body portion 101. An opening is formed in the upper surface of the main body portion 101, and a plurality of hooks 96 are provided to an edge portion of the opening. In addition, engagement pieces 97 are provided to the cover 102, are located at positions corresponding to the hooks 96, and have grooves engageable with the hooks 96. When the cover 102 is overlaid on the upper surface of the main body portion 101 and then the engagement pieces 97 are engaged with the hooks 96, the cover 102 is mounted on the main body portion 101.

A mounting plate 104 (an example of a holding plate of the present disclosure) on which the light source 221 is mounted is provided at one side in a lateral direction of the cover 102. The mounting plate 104 has light emitting elements such as LEDs mounted thereon so as to be aligned in the main-scanning direction. The mounting plate 104 is exposed on an upper surface of the carriage 220. In addition, the cover 102 has a narrow slit 103 formed so as to extend in a longitudinal direction thereof. The slit 103 is a through hole for guiding the light emitted from the light source 221, to the outside, and is covered with a light-transmitting plate member from the inner side. In addition, the cover 102 has a narrow slit 105 formed so as to extend in the longitudinal direction thereof. The slit 105 is a through hole for receiving reflected light from a document sheet and guiding the reflected light to the inner mirror 222, and is covered with a light-transmitting plate member from the inner side.

A guide portion 91 is provided at a lower poriton of an end poriton at the rear side in the longitudinal direction (a rear end portion) of the main body portion 101 and has the guide hole 92 through which the support shaft 80 is inserted. The guide hole 92 penetrates in the lateral direction of the carriage 220, and the support shaft 80 is inserted through the guide hole 92. In addition, the rail guide 93 is provided at a lower portion of an end portion at the front side in the longitudinal direction (a front end portion) of the main body portion 101 and is supported by an upper end of the support rail 82. The rail guide 93 is provided on a lower surface of the front end portion. In a state where the support shaft 80 is inserted through the guide hole 92, the rail guide 93 is placed on the upper end of the support rail 82, whereby the rail guide 93 is slidably supported by the support rail 82. Since the carriage 220 is supported by the support shaft 80 and the support rail 82 as described above, the front end portion of the carriage 220 is rotatable upward about the support shaft 80 if there are no other limitations. However, as shown in FIG. 3, the contact glasses 27 and 28 are provided above the carriage 220. Thus, if the front end portion is about to rotate upward upon reception of an external force caused by vibration, shake, shock, or the like, the upward rotation of the front end portion is limited by the contact glasses 27 and 28.

An aluminum substrate 110 (an example of the holding plate of the present disclosure) formed of an aluminum plate is mounted on a side surface of the rear end portion of the main body portion 101. An LED driver for controlling lighting of the LEDs as the light source 221 is mounted on the aluminum substrate 110. The LED driver is composed of an electric component such as an IC which implements a constant current drive circuit, a PWM control circuit, or the like. In addition, a printed substrate 111 (an example of the holding plate of the present disclosure) is mounted on a side surface (left side surface) of an end portion at the left side in the lateral direction (left end portion) of the main body portion 101. The printed substrate 111 is provided at the center of the left side surface of the main body portion 101. The image sensor 227 and a driver for driving and controlling the image sensor 227 are mounted on the printed substrate 111. In addition, electric components such as a sensor for detecting the position of the carriage 220 and the like are mounted on the printed substrate 111.

In the case where holding plates which hold electric components, such as the mounting plate 104, the aluminum substrate 110, and the printed substrate 111, are mounted on the surface of the carriage 220 as described above, if the carriage 220 moves and the holding plate comes into contact with an internal frame of the housing 21 during transportation of the image forming apparatus 10, the holding plate or the electric component may be damaged or broken down due to a shock at the time of contact. It is possible to prevent such contact by providing a fixing member which fixes the carriage 220 at a non-contact position. However, additional components such as the fixing member are required. In addition, a problem arises that a complicated mounting operation is involved in which the carriage 220 is moved to the non-contact position and then is fixed at that position by using the fixing member. It is possible to alleviate such a shock by providing a shock absorbing member to the carriage 220 or the internal frame. However, the component cost of the shock absorbing member is added to the manufacturing cost, and further the assembling cost is increased. In particular, in the case where substrates such as the aluminum substrate 110 and the printed substrate 111 are mounted on the surface of the carriage 220, during an operation of mounting the fixing member, the fixing member may come into direct contact with each substrate to damage the substrate. In addition, unless the carriage 220 is fixed by means of the fixing member, the carriage 220 moves, and the substrate comes into contact with the internal frame of the housing 21, so that the substrate is damaged. Moreover, even in the case where the shock absorbing member is provided, if the carriage 220 moves and the substrate comes into direct contact with the shock absorbing member, the substrate receives a shock from the shock absorbing member. If the shock is repeated, the substrate may be damaged or the electric component may malfunction. Thus, in the present embodiment, a configuration is provided such that the holding plate is prevented from coming into direct contact with the internal frame even when the carriage 220 moves due to vibration, shake, or the like during transportation of the image forming apparatus 10 for shipping the image forming apparatus 10. Thus, even if the carriage 220 comes into contact with the internal frame or the like within the housing 21, it is possible to prevent damage of the substrate mounted on the carriage 220 or breakdown of the electric component with a cheap and simple configuration.

Figure 9:
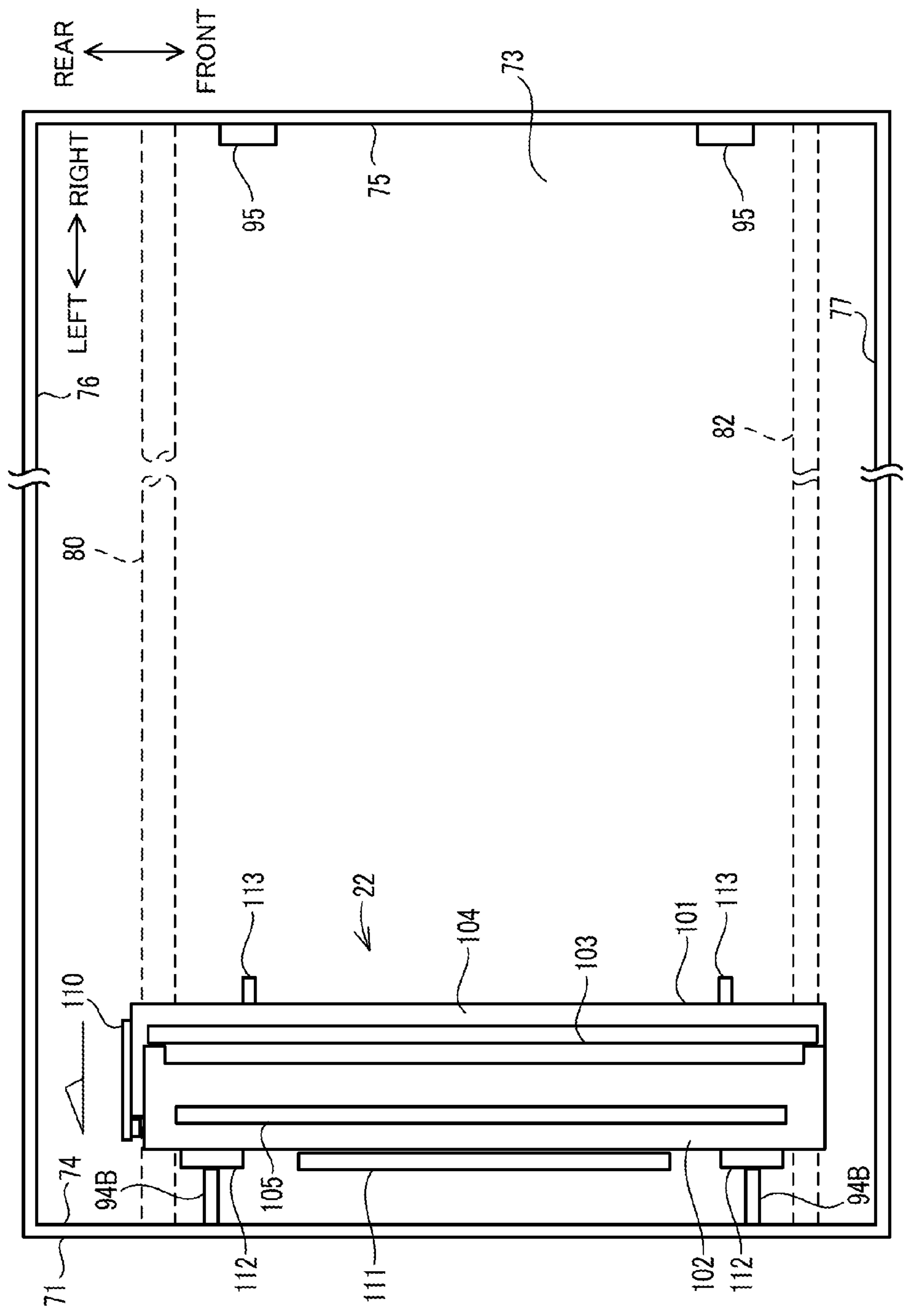
FIG. 9 is a diagram showing the position of the reading unit in the housing.

Specifically, as shown in FIG. 6, two contact portions 112 (an example of a first contact portion of the present disclosure) are provided on the left side surface of the main body portion 101 of the carriage 220 (a side surface of the carriage 220 at the moving direction side) so as to be contactable with the upper steps 94B of the projection ribs 94. The two contact portions 112 are provided at positions on the left side surface which are spaced apart from each other in the longitudinal direction of the main body portion 101. Specifically, the two contact portions 112 are provided at positions away from both sides of the printed substrate 111, respectively. The contact portions 112 are provided at positions corresponding to the upper steps 94B provided to the side plate 74 of the lower frame 71. Since such contact portions 112 are provided, as shown in FIG. 9, even if, during transportation of the image forming apparatus 10 in shipping the image forming apparatus 10, the carriage 220 moves and reaches a first position (a position shown in FIG. 9) where it is possible to contact with the projection ribs 94 of the lower frame 71, the contact portions 112 come into contact with the upper steps 94B prior to the printed substrate 111. That is, since the contact portions 112 come into contact with the upper steps 94B at the first position, the printed substrate 111 does not come into direct contact with the upper steps 94B, the side plate 74, and the like. Thus, the printed substrate 111 does not receive a shock caused by direct contact, and thus damage of the printed substrate 111 and breakdown of electric components such as the image sensor 227 and the driver for the image sensor 227 which are components mounted on the printed substrate 111 are prevented. It should be noted that the first position corresponds to a contact position of the present disclosure.

Figure 10:
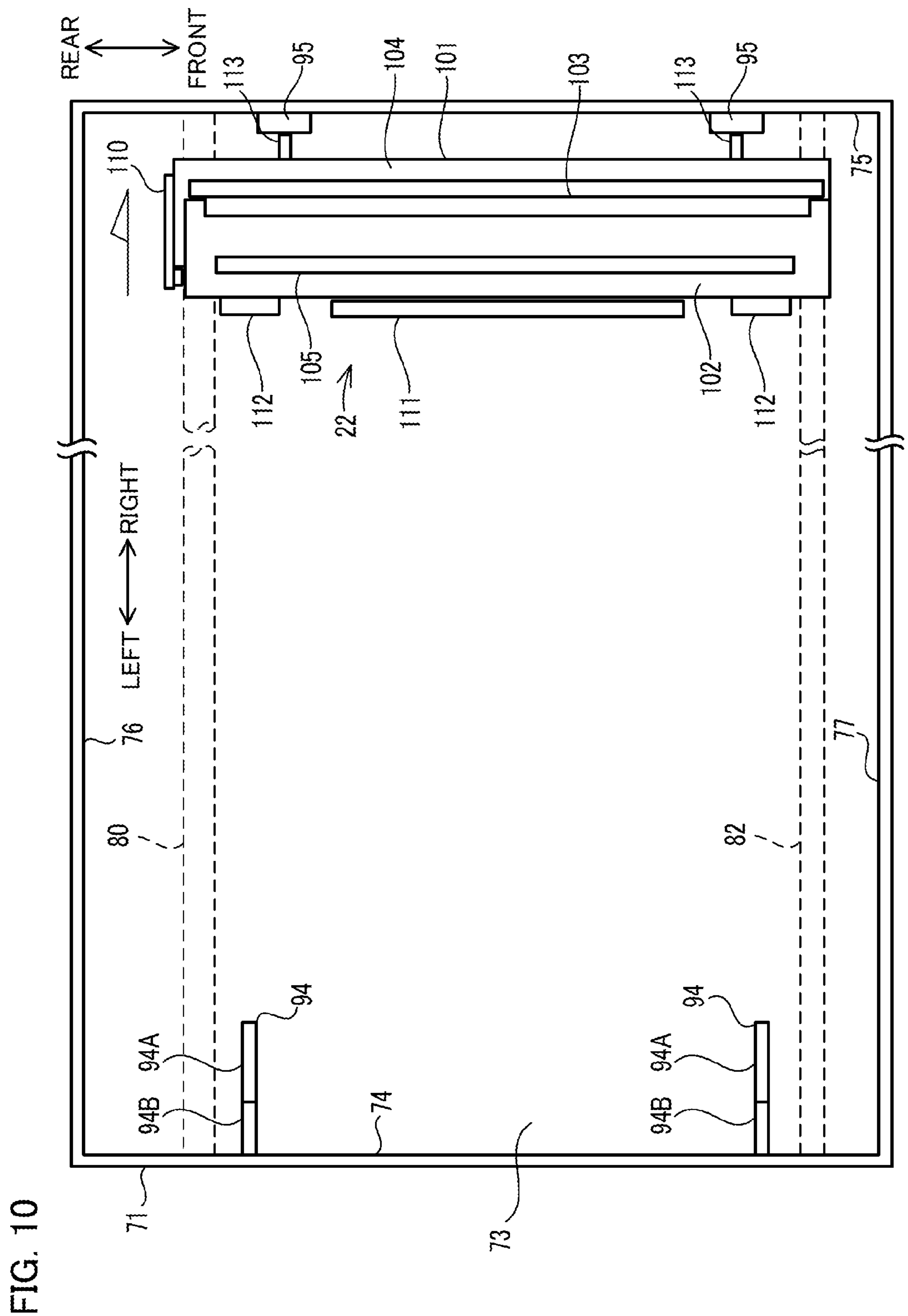
FIG. 10 is a diagram showing the position of the reading unit in the housing.

In addition, as shown in FIG. 7, two projections 113 (an example of the first contact portion of the present disclosure) are provided on a right side surface of the main body portion 101 of the carriage 220 (a side surface of the carriage 220 at the moving direction side) so as to be contactable with the stopper portions 95. The two projections 113 are provided at positions on the right side surface which are spaced apart from each other in the longitudinal direction of the main body portion 101. The projections 113 are provided at positions corresponding to the positions of the stopper portions 95 provided to the side plate 75 of the lower frame 71. The projections 113 project from the right side surface of the main body portion 101 in a direction perpendicular to the right side surface, and projection ends thereof extend rightward further than a right end portion of the mounting plate 104, so that the projections 113 project to positions beyond the mounting plate 104. In the present embodiment, the projections 113 project most on the right side surface of the carriage 220. Since such projections 113 are provided, as shown in FIG. 10, even if, during transportation of the image forming apparatus 10 in shipping the image forming apparatus 10, the carriage 220 moves and reaches a second position (a position shown in FIG. 10) where it is possible to contact with the stopper portions 95 of the lower frame 71, the projections 113 come into contact with the stopper portions 95 prior to the mounting plate 104. That is, since the projections 113 come into contact with the stopper portions 95 at the second position, the mounting plate 104 does not come into direct contact with the stopper portions 95, the side plate 75, and the like. Thus, the mounting plate 104 does not receive a shock caused by direct contact, and thus damage of the mounting plate 104 and breakdown of electric components such as the LEDs which are components mounted on the mounting plate 104 are prevented. It should be noted that the second position corresponds to the contact position of the present disclosure.

Figure 11:
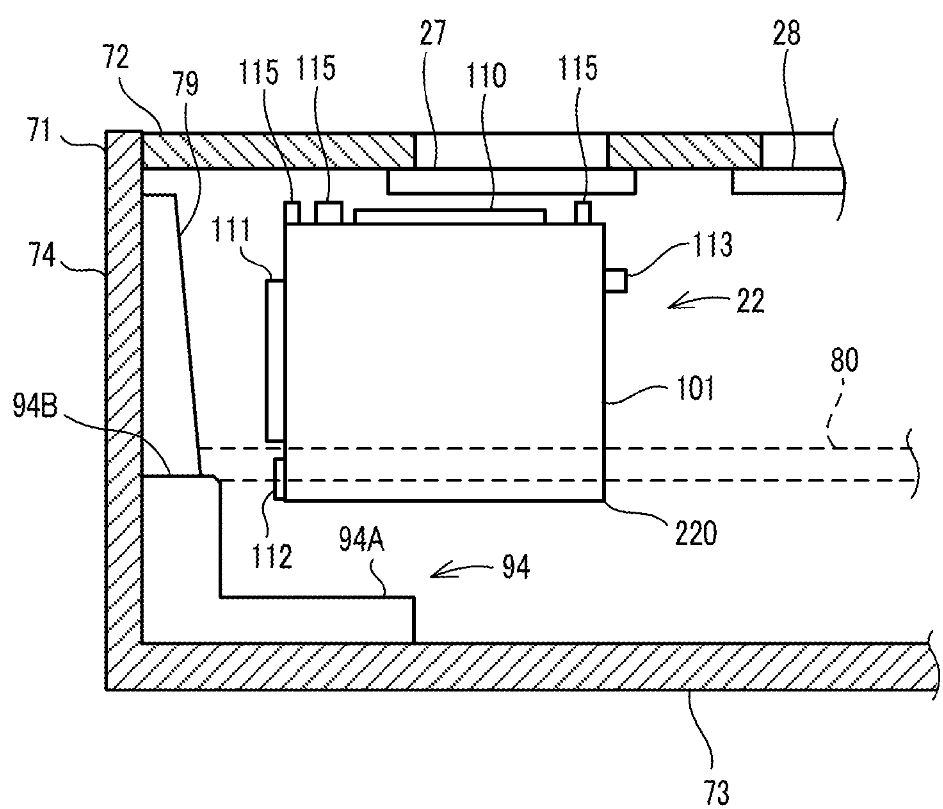
FIG. 11 is a diagram showing a positional relationship between the reading unit and contact glasses.

Moreover, as shown in FIGS. 6 and 7, a plurality of projections 115 (an example of a second contact portion of the present disclosure) are provided at an upper edge portion of the main body portion 101 of the carriage 220. In the present embodiment, four projections 115 are provided. Specifically, the projections 115 are provided at the center of a right upper edge portion of the main body portion 101, at the center of a left upper edge portion of the main body portion 101, and at both ends of the left upper edge portion in the longitudinal direction, respectively. The projections 115 project upward from the upper edge portion of the main body portion 101. Specifically, the four projections 115 project upward such that projection ends of all of the four projections 115 are flush with each other. The projection ends of the projections 115 reach positions spaced apart from each other at predetermined intervals between the contact glasses 27 and 28 located above the carriage 220. The projections 115 project upward further than the mounting plate 104, the aluminum substrate 110, and the printed substrate 111, and project to positions beyond the mounting plate 104, the aluminum substrate 110, and the printed substrate 111. In the present embodiment, the projections 115 project most on the upper surface of the carriage 220. Since such projections 115 are provided, as shown in FIG. 11, even if, during transportation of the image forming apparatus 10 in shipping the image forming apparatus 10, the front end portion of the carriage 220 rotates upward about the support shaft 80 and comes into contact with the back surfaces of the contact glasses 27 and 28, the projections 115 come into contact with the back surfaces of the contact glasses 27 and 28 prior to the mounting plate 104, the aluminum substrate 110, and the printed substrate 111. That is, since the projections 115 come into contact with the contact glasses 27 and 28 at this position, the mounting plate 104 and the like do not come into direct contact with the contact glasses 27 and 28. Thus, the mounting plate 104 and the like do not receive a shock caused by direct contact, and hence damage of the mounting plate 104 and the like and breakdown of the electric components which are components mounted thereon are prevented.

It should be noted that in the embodiment described above, the image reading device 11 is taken as an example of the image processing device of the present disclosure, but, for example, in the case where the moving body is an inkjet recording type recording head, the image processing device of the present disclosure may be an image processing device which performs an image recording process with the recording head. In addition, the image processing device of the present disclosure may be an image processing device including a moving body other than the carriage 220 and the recording head.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing device comprising:

a moving body composed of a resin member, the moving body having an upper surface on which a holding plate which holds an electric component used for image processing is mounted, the moving body being formed in a shape which is elongated in a longitudinal direction perpendicular to a predetermined moving direction;

a housing including a pair of side walls between which the moving body is housed therein;

a support portion provided to the housing, the support portion being configured to support the moving body such that the moving body is movable in a predetermined moving direction;

a contacted portion provided on an inner surface of each of the pair of side walls in the housing; and a first contact portion provided to the moving body, the first contact portion being contactable with the contacted portion within the housing prior to the holding plate when the moving body reaches a contact position where it is possible to contact with the contacted portion, wherein the first contact portion is provided on a side surface of the moving body at the moving direction side, the contacted portion is a projection rib which projects from the inner surface of each side wall in a direction perpendicular to the inner surface and which is brought into contact with the first contact portion without being brought into contact with the holding plate when the moving body reaches the contact position, the moving body includes a guide hole provided at one end thereof in the longitudinal direction and a supported portion provided at a lower surface at another end thereof in the longitudinal direction, the support portion includes: a support shaft which is provided so as to extend between the pair of side walls and is inserted through the guide hole; and a support rail which is long in the moving direction and configured to support the supported portion such that the supported portion is slidable in the moving direction, the image processing device further comprises:

a sheet placement plate which is mounted on an upper portion of the housing and on which a sheet member which is an image processing target is placed; and a plurality of second contact portions provided to the upper surface of the moving body, the second contact portions being contactable with the sheet placement plate prior to the holding plate when the moving body rotates upward about the support shaft, and the second contact portions are projections that are provided at a center of an edge portion at one side in a lateral direction of the moving body, at a center of an edge portion at the other side in the lateral direction of the moving body, and at both ends, in the longitudinal direction, of the edge portion at the other side, respectively, the second contact portions projecting upward from the upper surface of the moving body beyond the holding plate such that a predetermined gap is formed between the sheet placement plate and projection ends of the second contact portions.

2. The image processing device according to claim 1, wherein the first contact portion is a projection which projects from the side surface of the moving body in a direction perpendicular to the side surface and extends to a position beyond the holding plate.

3. The image processing device according to claim 1, wherein the moving body is a carriage of a reading unit configured to perform scanning in the moving direction to read a predetermined image during the image processing.

* * * * *